O. L. CASTLE.
Broom Head.
No. 63,211. Patented March 26, 1867.
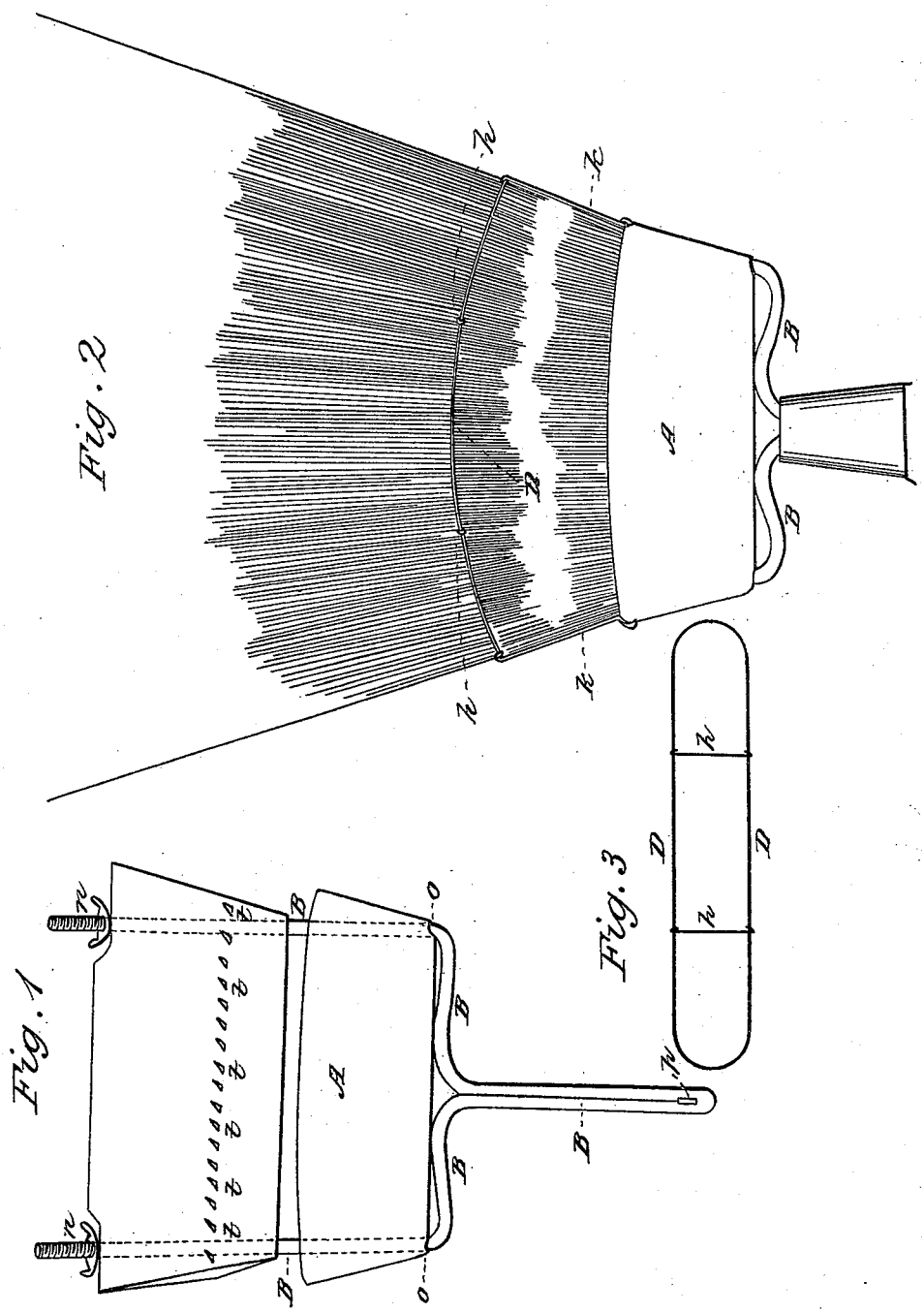
Witnesses:
Inventor:

United States Patent Office.

ORLANDO L. CASTLE, OF UPPER ALTON, ILLINOIS.

Letters Patent No. 63,211, dated March 26, 1867.

IMPROVED BROOM-HEAD.

*The Schedule referred to in these Letters Patent and making part of the same.*

TO ALL WHOM IT MAY CONCERN:

Be it known that I, ORLANDO L. CASTLE, of Upper Alton, county of Madison, and State of Illinois, have invented a new and useful improvement in Metallic Broom-Heads; and I do hereby declare that the following is a full, clear, and exact description of the construction and operation of the same, reference being had to the annexed drawings, making a part of this specification, in which—

Figure 1 is a perspective of the principal parts in their places.

Figure 2 is a similar view of the broom complete, showing the remaining parts in their places.

Figure 3 is a detail view.

A, fig. 1, is an oblate flattened sheath or socket of any convenient size, for the purpose of receiving and containing the butt ends of the straw. It is pierced at the extremed corners of its base with the orifices $o\, o$, to receive the prongs of the forked spring B. B B is a fork-shaped spring, answering both as a convenient frame for the head, and also as a spring to give elasticity to the broom in its operation, of which the shank or part designed to enter the handle is made by doubling together the wire of which it is formed to any desirable length, after which the two parts are bent, first laterally in opposite directions, and then forward, giving to the whole the appearance of a fork with two tines, the forward ends of which are formed into screws and furnished with the nuts $n\, n$. These tines are thrust through the orifices $o\, o$, at the corners of the base of the sheath A, forward through the open mouth of the same, as seen in fig. 1. A small opening, $p$, is left at the point of doubling the wire for the insertion of a prod or bolt. C is a trapezoidal wedge, armed with teeth, $t\, t$, for the purpose of fastening the butts of the straw within the sheath A, and sliding freely up and down upon the tines of the spring B B, which pass through it in the direction of its width, perpendicularly to its parallel sides. D, fig. 3, is an elliptic-shaped wire spanning the straw at a convenient distance beyond the mouth of the sheath, carrying the short double hooks $h$ for compressing the opposite sides of the said ellipse for the purpose of keeping the broom in shape. K K are also hooks for fastening the ends of the ellipse D respectively to the corresponding corners of the sheath A.

The operation of the whole is such that when the shank is driven into the handle and fastened by a prod through the orifice $p$, and the other principal parts are arranged in their proper places, as seen in fig. 1; then when the sheath A is filled with the butts of the straw, and the toothed wedge C is driven down by the operation of the nuts $n\, n$, into the midst of the straw in the mouth of the sheath A, the straw is thereby held securely in its place, after which it is shaped and stayed by the ellipse D, and the hooks $h\, h$ and $k\, k$, as seen in fig. 2, thus forming a light, comely, and durable broom; and especially since any force exerted upon the broom in its ordinary use will be exerted intermediately upon the unconfined portions of the spring B, which are free to yield, the result is to secure for the broom in its very mechanism a permanent elasticity.

Now, what I claim as my invention, and desire to secure by Letters Patent, is—

1. The use and employment of a spring, B, for the purpose and operating substantially after the manner herein set forth.

2. A combination of the spring B, the wedge C, and the nuts $n\, n$, with the sheath A, arranged and operating substantially as herein described and for the purpose herein set forth.

ORLANDO L. CASTLE.

Witnesses:
J. H. STIFLER,
S. G. NASH.